May 23, 1950     J. H. STANSBURY     2,508,728
METHOD OF CAPPING STRAWBERRIES

Filed April 5, 1949     2 Sheets-Sheet 1

Inventor
JOHN H. STANSBURY,
By Stone, Boyden & Mack,
Attorneys.

May 23, 1950
J. H. STANSBURY
2,508,728
METHOD OF CAPPING STRAWBERRIES
Filed April 5, 1949
2 Sheets-Sheet 2
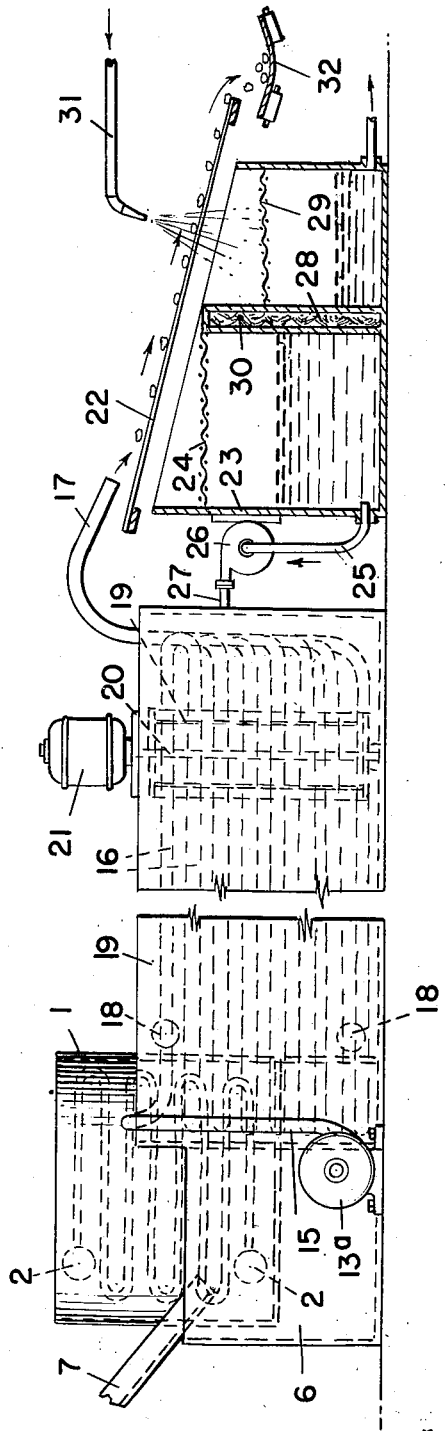
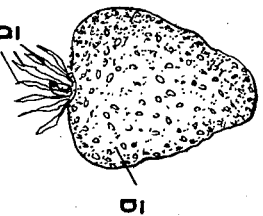
FIG. 3
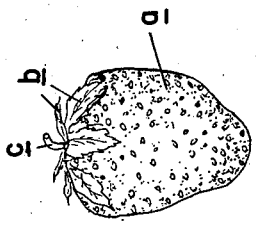
FIG. 4
Inventor
JOHN H. STANSBURY,
By Stone, Boyden & Mack,
Attorneys.

Patented May 23, 1950

2,508,728

UNITED STATES PATENT OFFICE 2,508,728

METHOD OF CAPPING STRAWBERRIES

John H. Stansbury, Wrightsville Beach, N. C., assignor to Stansbury, Inc., Baltimore, Md., a corporation of Maryland Application April 5, 1949, Serial No. 85,630

8 Claims. (Cl. 146—238)

This invention relates to the quick freezing of fruits and vegetables by the immersion method, and more particularly to the freezing of strawberries.

The present application is a continuation in part of my prior co-pending application Serial No. 746,790, filed May 8, 1947, now abandoned.

In the packing of strawberries, either by canning or freezing, one of the most difficult and exacting problems has been the preliminary removal of the caps and stems. Many machines have been devised for doing this work.

I have now discovered that it is not necessary to provide special machinery to remove the caps and stems from strawberries. I have found that, by introducing the fresh strawberries, just as they come from the field, into a liquid vehicle of the proper type and temperature, and passing them, mixed with the vehicle, through suitable freezing apparatus, the caps and stems may be removed by means of the immersion freezing process. This result may be achieved simply by causing agitation of the mixture of berries and liquid vehicle, and subjecting the berries to a tumbling action as they pass through the apparatus. The caps freeze, become brittle, and break off of the berries, and the fragments of caps and other deposits, held suspended in the vehicle, may be readily separated therefrom by straining or screening.

Although by no means limited to use with such apparatus, my novel process may be particularly well carried out by food freezing apparatus similar to that covered by my prior co-pending application S. N. 682,468, filed July 10, 1946, and it will be described in connection with such apparatus.

In order that the invention may be readily understood, reference is had to the accompanying drawings, forming part of this specification, and illustrating by way of example, apparatus of the kind above mentioned. In these drawings—

Fig. 2 is a side elevation thereof; and

Figs. 3 and 4 are side views of a strawberry having the cap thereon, and illustrating steps of my novel process.

Figure 1:
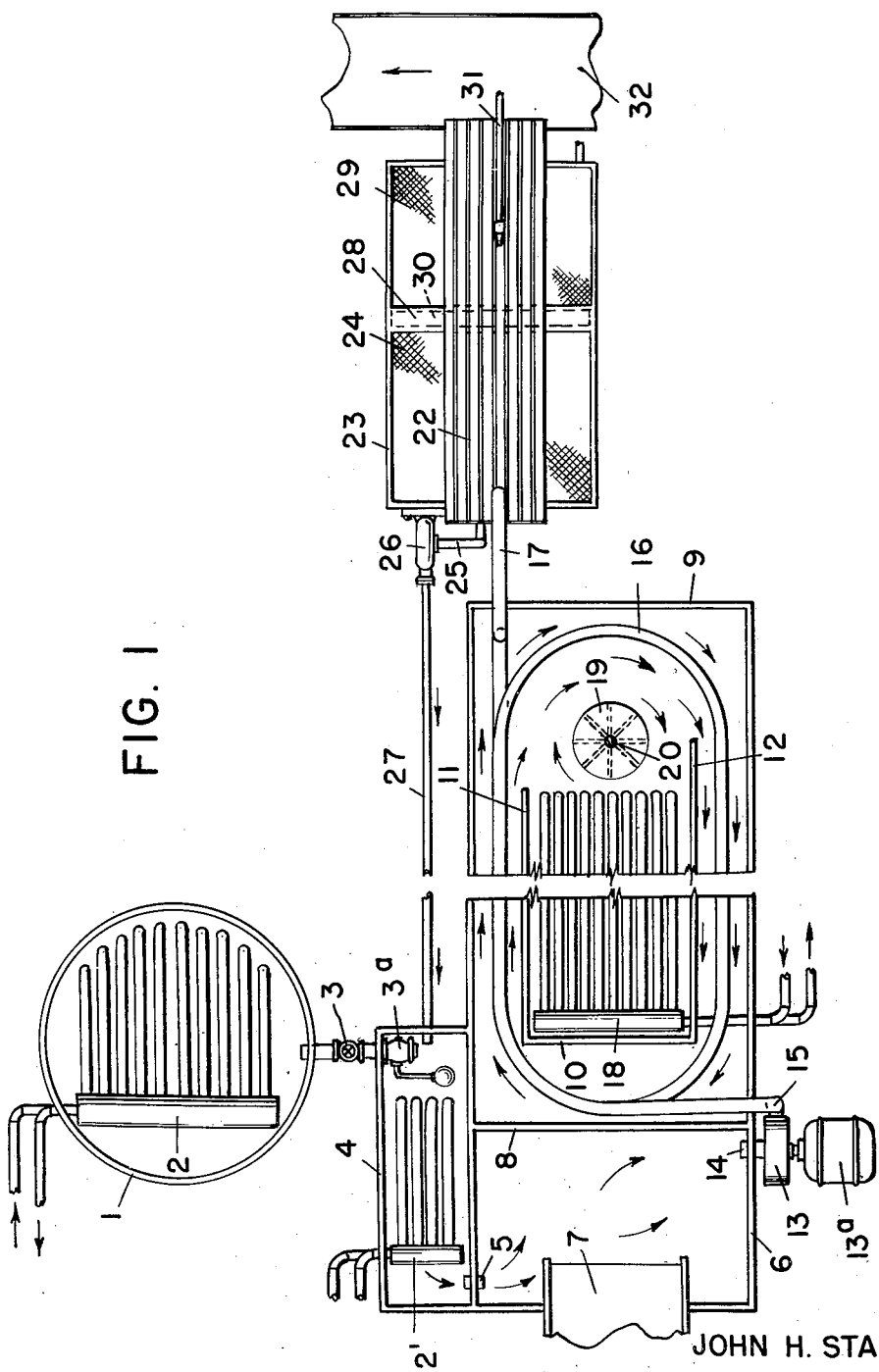
Fig. 1 is a diagrammatic plan view of such apparatus.

Referring to the drawings in detail, and more particularly first to Figs. 1 and 2 thereof, I have shown, at 1, a tank in which the liquid vehicle is contained, this tank having mounted therein a set of refrigerating coils 2 through which ammonia or other refrigerating agent is caused to circulate. Thus, the liquid vehicle in the tank 1 is subjected to a preliminary cooling and chilling treatment before it is delivered to the freezing apparatus. This liquid vehicle may be an aqueous solution of glycerin or a suitable sugar syrup, the liquid being of such concentration that it does not freeze at the temperature, namely about 0° F., at which the process is carried out, and having a relatively low viscosity.

The liquid vehicle is delivered through a valve 3 to a receiving tank 4, having a refrigerating coil 2' therein, and this tank, in turn, communicates through a port 5 with a mixing tank 6. A float controlled valve 3ª is preferably attached to the delivery pipe within the tank 4 for maintaining the level of liquid in this tank substantially constant, at a point well above the port 5. The berries to be frozen are delivered by a chute 7 into this mixing tank 6, the amount being properly proportioned to the amount of liquid in the tank in such manner that the berries are distributed throughout the liquid and are suspended therein, so as to form a fluid mixture.

The mixing chamber 6 is shown as having a wall 8 in common with a relatively large freezing chamber or tank 9. This may be filled with brine or a solution of calcium chloride or other suitable refrigerating medium, which refrigerating medium is maintained at a very low temperature, such as 5° below zero F. by means of suitable ammonia coils or the like 18.

These ammonia coils are located centrally of the freezing tank or chamber 9 and are spaced both from the side and end walls thereof. The coils are surrounded and enclosed on three sides by partitions 10, 11 and 12, one of these partitions, such as 12, projecting longitudinally somewhat beyond the ends of the refrigerating coils, as shown in Fig. 1.

Wholly outside of the tank or chambers, I mount a centrifugal pump 13, driven by a motor 13ª, and having its intake conduit 14 communicating with the mixing chamber 6, at a point near the bottom thereof. The pump 13 is provided with a delivery conduit 15, shown as extending vertically up over the upper edge of the freezing tank or chamber 9, where it connects with one end of a relatively long tubular conduit 16, arranged in the form of a coil having substantially horizontal convolutions disposed one above the other.

This coiled conduit, which is preferably several inches in diameter, is disposed within the tank 9 and lies in the space between the partitions 10, 11 and 12 and the side and end walls of the tank.

In other words, this coiled conduit may completely surround the refrigerating coils 10.

Also disposed within the convolutions of the coiled conduit, adjacent the ends of the refrigerating coils where there is no partition, is an agitator shown as a paddle wheel 19, mounted on a vertically extending shaft 20, having, at its upper end, a motor 21 by which it is driven. This motor is omitted from Fig. 1 for the sake of clearness.

It will be observed that, as the paddle wheel 19 revolves, it will tend to set up currents in the brine or other refrigerating medium in the tank, as indicated by the arrows in Fig. 1, thus causing the refrigerating medium to circulate freely around the tank. The projecting end of the partition 12 serves as a baffle to deflect a portion of the refrigerating medium through the spaces between the refrigerating coils 18, while other portions of the medium flow between the partition 12 and the side wall of the tank, and thence around the spaces between the partitions 10 and 11 and the end and other side wall of the tank, thus circulating freely about the entire length of the coiled conduit 16. By this means, the refrigerating medium is kept at an extremely low temperature throughout the tank, and consequently the coiled conduit 16 is maintained at a temperature well below the freezing point of the food products to be frozen.

The end 17, of the coiled conduit 16, is arranged to deliver upon an inclined, slatted screen 22, beneath which is disposed a pair of tanks 23, 28, separated by a wall 30, preferably insulated. In the upper part of the tanks are placed removable wire screens or strainers 24 and 29. A pump 26 draws liquid from the tank 23 by means of a pipe 25, and returns it through pipe 27 to tank 4.

A pipe 31, provided with a suitable nozzle, is arranged to spray water onto and through the slatted screen 22, and beneath the lower or discharge end of this screen may be placed a suitable conveyer 32.

Fig. 3 shows the approximate appearance of a berry as it appears after having been packed in a basket or other container. The leaves b of the cap, just after the berry is picked lie somewhat loosely around the stem c but after having been packed in a basket or the like these leaves are in many cases pressed down closely upon the berry a.

In operation the berries are dumped from the baskets or containers into the chute 7 from which they fall into the mixing chamber 6 which, as above described, is supplied with a quantity of suitable liquid maintained at a very low temperature such as about 0° F. Moreover, while the pump 13 is in operation the liquid is caused to move in a strong current from the port 5 across the chamber 6 into the pump intake 14. This strong current serves to agitate the berries as they are mixed with the liquid in the chamber.

As the berries contact the chilled liquid, the flexible green leaves of the cap are almost instantly frozen stiff. Moreover, the glycerin or syrup enters between the leaves and the berry, causing the leaves to more or less stand up or off from the berry as shown in Fig. 4. By virtue of the fact that the liquid is of such concentration that it does not freeze at the temperature to which it is subjected, the leaves of the cap cannot become plastered down or frozen to the berry. The liquid maintains them separated from the body of the berry. The mixture of berries and liquid, with the caps frozen and brittle, as above described, and before the berries themselves are frozen to any great extent is drawn in to the pump intake 14 and forced out through the pipe 15 and coil 16. As the berries progress through this coil they rapidly become frozen, as described in my above mentioned co-pending application, and, as they pass through the coil and around the bends thereof they are subjected to a tumbling and abrading action which results in breaking off the frozen brittle caps and stems from the now rigid berries.

When the mixture reaches the discharge end 17 of the freezing coil it consists of frozen berries and the liquid vehicle, with which is mixed the broken fragments of the frozen caps and stems.

The inclined screen 22 has its slats set so closely together that the berries cannot pass between them, but the fragments of caps and stems can. Consequently when the liquid vehicle carrying the frozen berries and fragments of caps and stems is discharged upon the screen 22, the berries roll on down this screen while the liquid and the major portion of the fragments of caps pass through the cracks of the screen down into the tank 23. As they enter this tank, the screen 24 serves to retain and separate most of the cap fragments and other foreign matter. The liquid vehicle is returned from the tank 23 by pump 26, through pipes 25 and 27, to the receiving tank 4. The wire screen 24 may be removed from time to time and cleaned as deposits accumulate thereon.

As the berries travel on down the screen 22, after the liquid vehicle has been separated, a few fragments of caps still cling to them. For the purpose of removing these adhering fragments I wash the berries by means of a spray of cold water from the pipe 31. This water tends to clean off any adhering fragments of caps or stems, which then pass down with the water into the tank 28, the larger particles being retained by the screen 29. The capped berries discharged from the lower end of the screen 22 may be deposited upon a suitable conveyor or inspection belt 32, or otherwise disposed of.

In this connection it may in some cases be desirable to discharge the berries into the brushing apparatus shown in my said above mentioned co-pending application Serial No. 682,468 where the last traces of cap fragments may be brushed off.

As a result of the washing and/or brushing operation above described, the capped and cleaned berries emerging from the apparatus are in most cases not sufficiently hard frozen for storage, and I therefore contemplate subjecting them to a further freezing operation. This may be carried out by passing them through a second freezing unit, either of the immersion type, such as above described, or any other suitable type. However, when the capped and washed berries, such as result from the use of the present invention, are further frozen by an immersion process, the freezing solution remains exceptionally clean and clear, and uncontaminated by foreign matter.

What I claim is:

1. The method of removing the green caps from fresh strawberries which comprises immersing the berries in a liquid having a freezing point lower than that of the caps, and chilled to a temperature at which the caps freeze, and agitating the berries in such liquid.

2. The method of capping strawberries which comprises immersing them in a liquid having a freezing point lower than that of the caps, and chilled to a temperature at which the caps freeze, and then agitating the berries by centrifugally impelling the mixture of berries and liquid along a confined path in heat exchange relation with a refrigerating medium chilled to a point at which the berries, but not the liquid, freeze.

3. The method of capping strawberries which comprises immersing them in a liquid having a freezing point lower than that of the caps, and chilled to a temperature at which the caps freeze, and then causing the mixture of berries and liquid to traverse a refrigerated unobstructed conduit chilled to a point at which the berries, but not the liquid, freeze, and said conduit having a plurality of bends.

4. The method of capping strawberries which comprises immersing them in a liquid having a freezing point lower than that of the caps, and chilled to a temperature at which the caps freeze, and then subjecting the berries to a tumbling action, while still immersed in such liquid.

5. The method of removing the green caps from fresh strawberries which comprises freezing the berries and caps by immersion in a chilled liquid having a freezing point lower than that of the caps, so as to render the caps brittle, while maintaining the free portions thereof out of contact with the berries, and then disintegrating the freely projecting caps.

6. The method of simultaneously capping and freezing strawberries which comprises immersing the fresh berries in a suitable freezing solution having a freezing point below that of the caps and berries, agitating the berries and subjecting them to a tumbing action while immersed in said liquid, and maintaining said liquid at a temperature below that at which both said caps and berries freeze.

7. The method of treating uncapped fresh strawberries which comprises immersing them in a solution having a freezing point below that of the caps and berries, maintaining said solution at a temperature below the freezing point of both said caps and berries, keeping the berries in said solution until both the berries and caps are frozen and the latter rendered brittle, disintegrating the brittle caps, and finally separating the frozen berries from the solution and the disintegrated cap fragments.

8. The method of capping fresh strawberries which comprises immersing them in a liquid having a freezing point lower than that of the caps, and chilled to a temperature at which the caps freeze, then subjecting the berries to a tumbling action, while still immersed in such liquid, thus disintegrating the brittle caps, separating the berries from the liquid, and finally washing the berries to remove adhering fragments of caps.

JOHN H. STANSBURY.

REFERENCES CITED

The following references are of record in the file of this patent:

UNITED STATES PATENTS

| Number | Name | Date |
| --- | --- | --- |
| 603,029 | Pettit, Jr. | Apr. 26, 1898 |
| 812,971 | Adams | Feb. 20, 1906 |
| 1,234,697 | Foote | July 24, 1917 |
| 2,103,925 | Zarolschenzeff | Dec. 28, 1937 |
| 2,315,929 | Bridges | Apr. 6, 1943 |
| 2,329,333 | Carter | Sept. 14, 1943 |
| 2,383,268 | Morgan | Aug. 21, 1945 |
| 2,418,746 | Bartlett et al. | Apr. 8, 1947 |